United States Patent
Savioli

(12) 
(10) Patent No.: US 6,457,966 B1
(45) Date of Patent: Oct. 1, 2002

(54) APPARATUS WITH MULTIPLE OPERATING PHASES FOR FORMING STABLE AND INTERNALLY REGULAR BELL MOUTH SHAPES ON THE TERMINAL JUNCTION SECTION OF PIPES MADE OF THERMOPLASTIC MATERIAL

(75) Inventor: Leopoldo Savioli, Alfonsine (IT)

(73) Assignee: SICA S.p.A., Alfonsine (IT)

(*) Notice: Subject to any disclaimer, the term of this patent is extended or adjusted under 35 U.S.C. 154(b) by 0 days.

(21) Appl. No.: 09/537,191

(22) Filed: Mar. 29, 2000

(30) Foreign Application Priority Data

Mar. 31, 1999 (EP) .................................. 99830187

(51) Int. Cl.⁷ .............................................. B29C 57/06
(52) U.S. Cl. ........................ 425/389; 425/393; 425/392; 425/DIG. 218
(58) Field of Search ................................ 425/389, 392, 425/393, 384, 387.1, DIG. 218

(56) References Cited

U.S. PATENT DOCUMENTS

| 3,677,684 A | | 7/1972 | Platz ............................ 425/393 |
| 4,239,473 A | * | 12/1980 | Fulhaber ...................... 425/392 |
| 4,412,802 A | * | 11/1983 | Ohta et al. ................... 425/393 |
| 4,643,658 A | * | 2/1987 | Gordon ........................ 425/388 |
| 5,928,451 A | * | 7/1999 | Johansson et al. .. 425/DIG. 218 |

FOREIGN PATENT DOCUMENTS

| DE | 36 13 579 | | 11/1986 |
| EP | 963833 A1 | * | 12/1999 |
| FR | 2022958 | | 8/1970 |
| FR | 2184857 | | 12/1973 |

* cited by examiner

Primary Examiner—Jan H. Silbaugh
Assistant Examiner—Thu Khanh T. Nguyen
(74) Attorney, Agent, or Firm—Fay, Sharpe, Fagan, Minnich & McKee, LLP

(57) ABSTRACT

Apparatus for forming a bell mouth on a pre-heated pipe includes a first portion with means for moving the first portion from a first position to an expanded position. Means for heating the first portion to a temperature at least equal to the pipe pre-heat temperature are provided. A second portion is geometrically fixed and includes an outer diameter that is equal to the final inner diameter of the bell mouth. The outer diameter of the second portion is less than the outer diameter of the expanded first portion. Means are provided for cooling the second portion. A third portion includes a hollow rubber element that is expandable, from a first diameter less than the starting inner diameter of the pipe to a second diameter between the first diameter and the outer diameter of the expanded first portion.

20 Claims, 2 Drawing Sheets

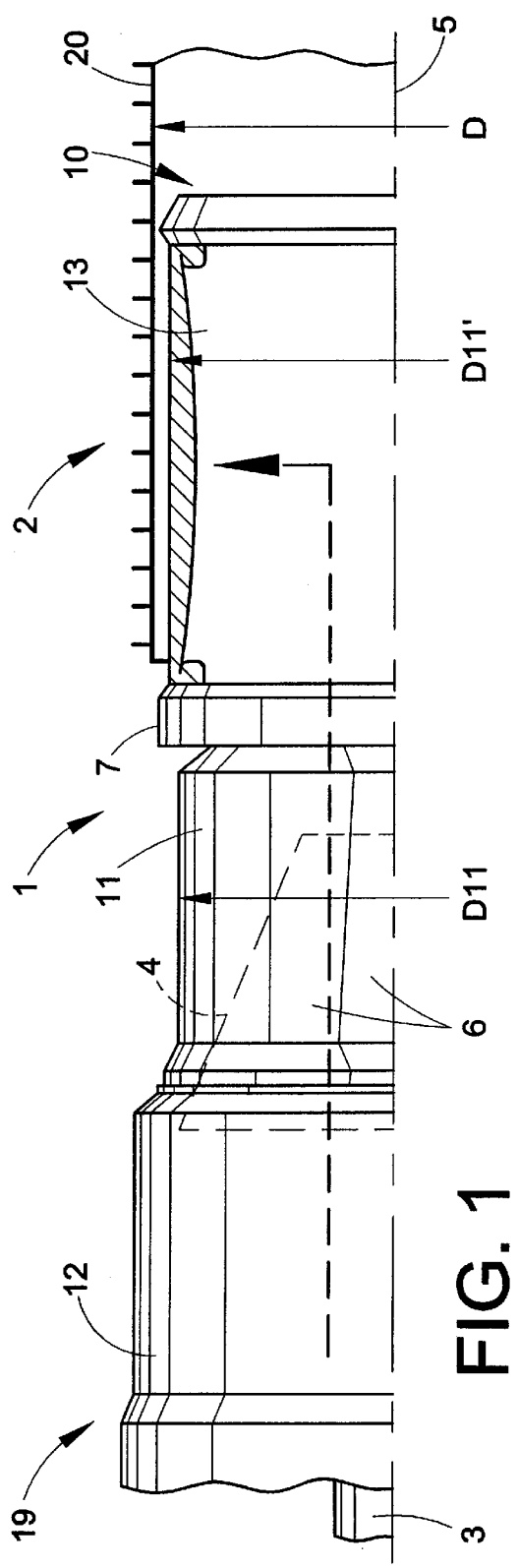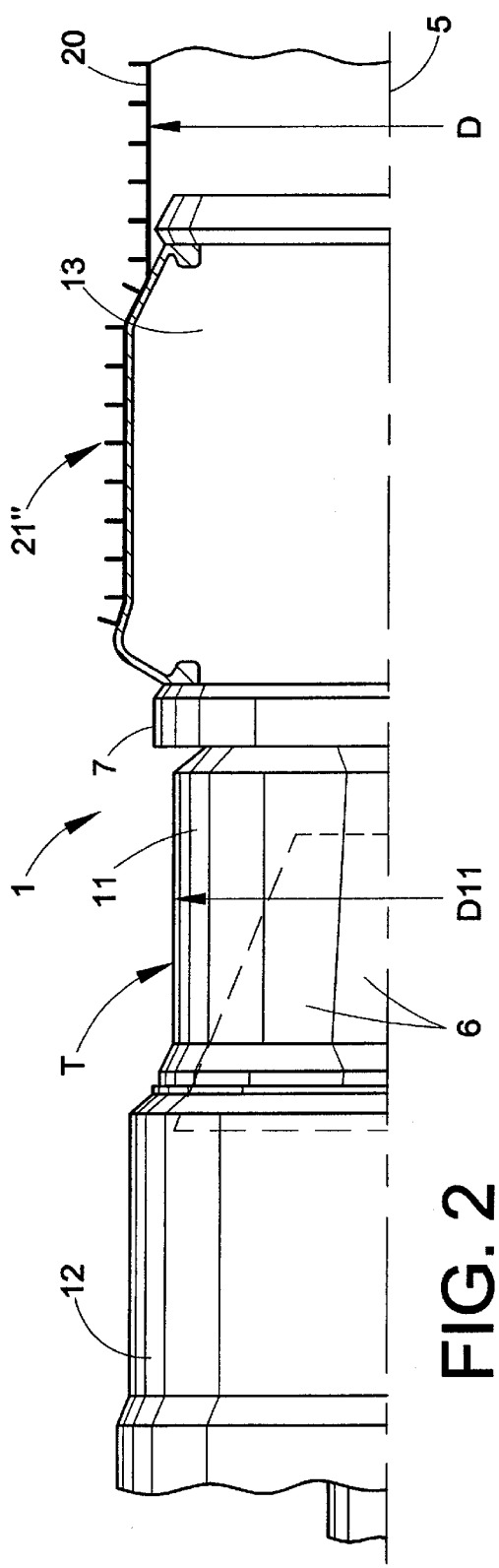

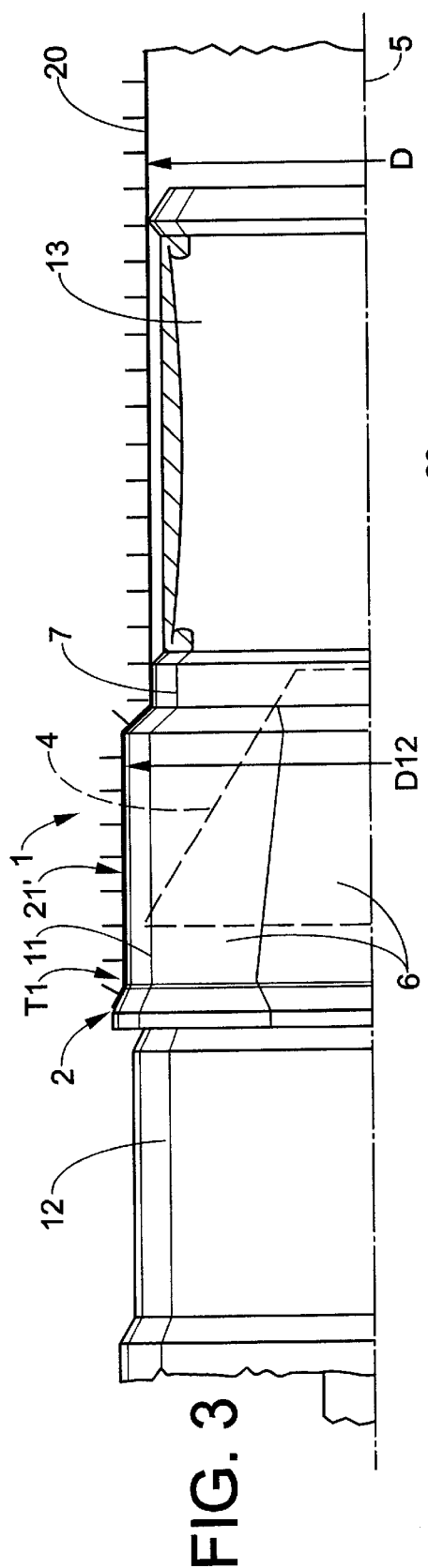
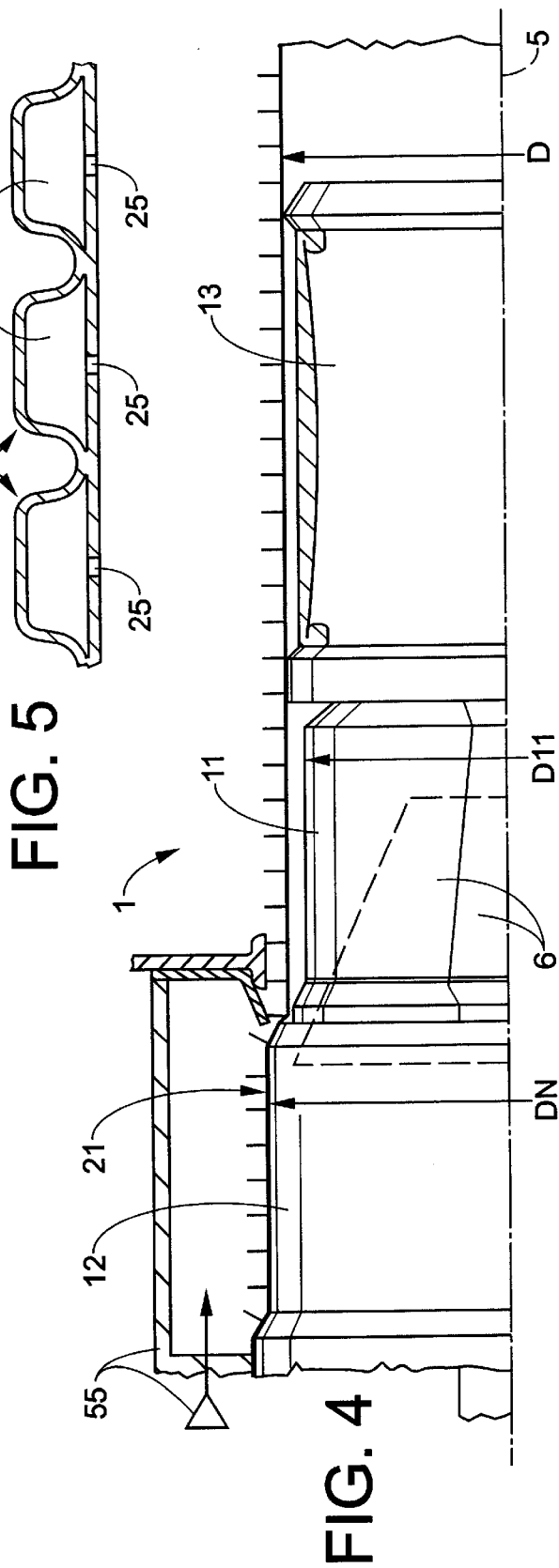

US 6,457,966 B1

APPARATUS WITH MULTIPLE OPERATING PHASES FOR FORMING STABLE AND INTERNALLY REGULAR BELL MOUTH SHAPES ON THE TERMINAL JUNCTION SECTION OF PIPES MADE OF THERMOPLASTIC MATERIAL

BACKGROUND OF THE INVENTION

The present invention relates an apparatus for forming stable and internally regular bell mouth shapes on the terminal junction section of pipes made of thermoplastic material, of the type operating on a terminal junction section, previously heated to the plastic state and comprising:

a first portion of the type with radially movable mechanical sectors, whose length, measured along the longitudinal axis of the mandrel is equal to the length of the bell mouth and movable from one first extreme retracted position in which the first portion presents such a diameter as to be freely introduced into the terminal section of the pipe, to a second extreme expanded position which dilates the entire part of the terminal section that surrounds it, thereby forming a temporary bell mouth, of maximum dilation, whose temporary inner diameter, corresponding to the outer one of said first portion in position of extreme expansion, is greater than the final nominal inner diameter of the definitive bell mouth, said first portion being heated to a temperature that is greater than or equal to that of the terminal section, so that the latter does not release heat during its plastic dilation to form the temporary bell mouth of maximum dilation, the first portion then returning to the first extreme retracted position;

a second portion, geometrically fixed, presenting an outer diameter that is equal to the nominal and final inner diameter of the definitive bell mouth, said second portion being able to be introduced into the temporary bell mouth of maximum dilation, after the complete intervention of said first portion which, in the retracted position, allows the free subsequent introduction of said second portion into the temporary bell mouth of maximum dilation, said second portion being able to calibrate exactly the inner diameter of the bell mouth, subject to spontaneous retraction after the previous dilation and being cooled below the temperature of the terminal section, thereby rapidly bringing the definitive bell mouth shape to ambient temperature once it has reached the definitive nominal diameter.

In this technological sector there are difficulties to overcome, linked to the necessary precision that the bell mouth shapes must provide at least internally, in order to obtain an effective junction between multiple sections of pipe, as well as to the problem of the shrinking by the thermoplastic material, after the definitive formation of the bell mouth shape. It is well known that the molecules of the thermoplastic materials that are subjected to dimensional change, remember the previous physical state and tend to return to the original state. Hence when bell mouth shapes are effected, which increase the diameter of the pipe, extruded when hot, the pipe would tend to return to the previous state, i.e. with a smaller diameter than the one formed with the bell mouth shaping operation. Moreover, the aforesaid shrinking varies according to the thermoplastic material in use (polypropylene, PVC, polyethylene, polyolefins in general).

To solve the problem of the precision of the internal measurements of the bell mouth shaping, techniques have for instance been adopted whereby the bell mouths are shaped with mechanical mandrels conformed according to the bell mouth shape to be obtained. They were forcedly introduced into the terminal section of pipe to be given a bell mouth shape, previously heated to its plastic deformation temperature, provided the pipe to be treated had sufficient thicknesses so that it would not collapse during the introduction of the mandrel. In the case of bell mouth shapes that comprise internal annular gaskets, for better sealing, radially expandable and subsequently retractable mechanical sectors are provided to allow the formation, under heat, of the gasket seat in the bell mouth.

In regard to the aforesaid technique, reference is made to European Patent EP. N.052.581, of Oct. 14, 1981, in the name of the same Applicant, which provides a good description of the wedge shaped actuation means (with inclined planes for constraining each mechanical sector) and the conformation of the mechanical sectors themselves, so shaped as to constitute, when expanded, a homogeneous bearing surface for shaping, from within, the annular seat for the bell mouth gasket.

Techniques have also been studied that provide for exerting inward pressure from the exterior, on the pre-heated terminal section of the pipe, countered by an internal mandrel, but these techniques are not applicable to the case at hand, which aims at applying a precise bell mouth shape without material shrinking, also for corrugated pipes, which clearly cannot be treated under heat, with pressure by fluid or mechanical means from the exterior and which notoriously have rather low thicknesses, in favor of the corrugations and/or external fins or contours.

In order to solve the problem of the shrinking by the thermoplastic material, in 1983 the Applicant perfected an apparatus that provides a shaping chamber defined internally by a mandrel that presents the final shape and nominal measurements of the bell mouth to be obtained, and externally by moulds whereon the terminal section of pipe to be treated is preliminarily made to adhere, by means of pressurized air coming from the interior of the mandrel. The terminal section is thus expanded beyond its required nominal size, keeping it for a certain time in contact against the aforesaid external moulds, then letting the bell mouth so formed retract spontaneously and calibrate itself with precision on the underlying mandrel, whereon conduits for the outflow of the pressurized air are provided.

It has been observed that in such cases the shrinking by the thermoplastic material was absent or in any case highly reduced after the complete formation of the bell mouth shape and an adequate precision was obtained, since an internal calibration of the bell mouth shape was always present.

Unfortunately, this technique too is clearly not applicable to pipes made of thermoplastic material that are corrugated or externally provided with fins and/or contouring.

Therefore an apparatus has been realized by the same Applicant, as per European patent application no. 98839360.8, of Jun. 11, 1998 and as per the foreword to the description. In this patent documentation, the device able to produce the forced dilation is a mandrel with mechanical sectors, radially movable from a first retracted position, in which it can freely be introduced into the terminal section, to a second expanded position, in which it dilates the terminal section until forming the temporary bell mouth shape with greater than nominal diameter.

This apparatus, although it is valuable to realize bell mouths on corrugated or contoured pipes, can nonetheless be further improved. It has been noted that this technique causes, on the inner surface of the bell mouth, some impressions due to contact with the lateral extremities of the radially moving sectors, during their passage from the retracted position of minimum size to that of maximum expansion or maximum size.

SUMMARY OF THE INVENTION

Therefore the aim of the invention, as it is characterized in the enclosed claims, is to eliminate the aforementioned drawback, providing additional advantages and retaining those already present.

The invention retains the advantage of being applicable to any type of thermoplastic pipe available on the market, including corrugated ones and/or those with external contouring (for instance, of the kind called ultrarib), notoriously with reduced thickness, realizing stable bell mouths.

It further provides the advantage of allowing very precise bell mouth shapes, with perfectly regular inner surfaces and without any kind of impression, even when the dilation of the terminal section beyond the nominal size of the bell mouth to be obtained is effected with mandrels of the kind with radially movable mechanical sectors.

Not the least advantage is also to provide a considerable rapidity of execution, a phase having been provided whereby the calibration operation is accelerated, by means of air pressure from the exterior, which can also be used effectively for corrugated pipes, which as is well known have never been subjected to said external pressures, due to the danger that they may implode.

BRIEF DESCRIPTION OF THE DRAWINGS

Further features and advantages shall be made more readily apparent from the content of the detailed description that follows, made with reference to the accompanying drawings, which represent an embodiment provided purely by way of non limiting example, in which:

FIG. 1 schematically shows a preferred embodiment of a semi-portion of the subject apparatus comprising a composite mandrel in a side view and in a preliminary operating phase, with some parts shown schematically and others removed, the better to highlight other parts;

FIG. 2 schematically shows the mandrel of FIG. 1, at the end of the preliminary operating phase;

FIG. 3 schematically shows the mandrel of FIGS. 1 and 2, in a subsequent operating phase;

FIG. 4 schematically shows the mandrel of the previous figures, during the final operating phase;

FIG. 5 shows a section of a corrugated pipe according to the invention.

DESCRIPTION OF THE PREFERRED EMBODIMENTS

With reference to the above figures, the subject apparatus preferably comprises a composite mandrel (1) with multiple operating phases. It substantially comprises, proceeding from the front extremity (10) to the rear extremity (19), a preliminary intervention portion (13), a first portion (11) and a second portion (12).

The first portion (11) is of the type with radially movable mechanical sectors (6), whose length, measured along the longitudinal axis (5) of the mandrel (1), is equal to the length of the bell mouth (21, 21'). The mechanical sectors are movable from a first extreme retracted position (see FIGS. 1, 2 and 4) in which the portion (11) presents a lesser diameter (D11) than the inner diameter (D) of the pipe (20) or at least lesser than the diameter (D11') which shall be better described farther on, in such a way as to able freely to be introduced into the terminal section (2) of the pipe (20), and a second extreme expanded position (see FIG. 3) which dilates the part of the terminal section (2) that surrounds it. In this phase, a temporary bell mouth (21') of maximum dilation is formed, whose temporary inner diameter (D12), which corresponds to the outer diameter of the first portion (11) in the extreme expansion position, is greater than the nominal final inner diameter (DN) of the definitive bell mouth (21).

In this case as well, as in the known case of EP patent no. 052.581, the organs (4) for actuating the mechanical sectors (6) are represented by a wedge with inclined planes, shown schematically because it is already known. For the proper operation of the organs (4) the first portion (11) is interposed between the second portion (12) and an extremity head (7), also presenting a lesser diameter than the inner diameter (D) of the pipe (20), so that the mechanical sectors (6) are bilaterally guided along planes that are perpendicular to the longitudinal axis (5) of the mandrel (1). The first portion (11) is heated to a temperature (T) greater than or equal to that (T1) of the terminal section (2), so that the latter does not release any heat during its plastic dilation to form the shaped bell mouth (21').

The first portion (11) then returns to the first extreme retracted position (see FIG. 4).

This having been stated, the preliminary intervention portion (13), which is positioned forward of the extremity head (7) related to the first portion (11), performs the preliminary phase (see FIGS. 1 and 2). In particular, the portion (13) is of the type constituted by a hollow rubber element, expandable from within by inflation, from a first rest and minimum size configuration, to a second configuration of maximum expansion. In the first configuration the rubber element presents a lesser maximum diameter (D11') than the inner diameter (D) of the pipe (20), thereby being able to be introduced freely and preliminarily first into the terminal section (2) of the pipe (20). In the second configuration instead it presents a substantially cylindrical shape with diameter (D) ranging between the inner diameter (D) of the pipe (20) and the temporary internal diameter (D12) of the temporary maximum dilation bell mouth (21"), into which said first portion (11) will subsequently be introduced to effect the residual dilation until forming said temporary maximum dilation bell mouth (21').

Advantageously, the hollow element presents variable thickness thereby maintaining a substantially cylindrical shape upon inflation, before the action of the aforesaid mechanical sectors (6). Since the mechanical sectors (6) have to provide only a small expansion to the bell mouth (21") which is already almost completely dilated, with the rubber element that leaves no impression, and since they are, when expanded completely, perfectly free of discontinuities and simultaneously define a perfect cylindrical geometric shape, it is possible thereby to obtain a maximum dilation bell mouth (21') with a perfectly regular inner contour.

The second portion (12), which instead is geometrically fixed and placed consecutively to the first (11), presents an outer diameter equal to the nominal and final inner diameter (DN) of the definitive bell mouth (21).

It can in fact be introduced into the temporary maximum dilation bell mouth (21') (see FIG. 4), after the complete intervention thereon by the first portion (11) which, in retracted position, allows the free subsequent introduction of the second portion (12) into the bell mouth (21'), which is completely free of any external impression.

This second portion (12), having a diameter that is rigorously equal to the nominal one required, guarantees and has the function of exactly calibrating the inner diameter of the bell mouth (21), preliminarily enlarged to the temporary one (21') and which is subjected to spontaneous retraction, after the previous dilation, by effect of the natural characteristic of such materials and in particular of polypropylene (this represents the fourth final phase, see FIG. 4). In this way stability is guaranteed to the bell mouth (21), even if it is provided with external fins or contouring.

The second portion (12) is cooled below the temperature (T1) of the terminal section (2), thereby rapidly bringing the definitive bell mouth (21) to ambient temperature, once it has spontaneously retracted from the diameter (D12) to the definitive nominal one (DN). It should lastly be noted that, advantageously, the diameter (DN) of the second portion (12) is computed as a function of the type of thermoplastic material used for the pipes (20) to be treated. Thus the second portion (12) is removably interchangeable.

To co-ordinate the various movements synchronously according to the various phases and with minimum time expenditure, organs (3) are provided for actuating relative motion between the mandrel (1) and the pipe (20), operating along the longitudinal axis (5) of the mandrel (1) and organs (4) for driving the expansion and retraction of the first portion (11).

The invention thus conceived can be subject to numerous modification and variations without thereby departing from the scope of the inventive concept expressed below, like the one in which all portions (11) and (12) are separate, with distinct working axes or at least one of them is separated from the others.

Moreover, the apparatus can comprise, in combination with the second portion (12), means (55) able to impart compressed fluid pressure acting from the exterior on the external wall of the terminal section (2) during the calibration phase, to accelerate the phase itself and further to improve the regularity of the inner surface of the definitive bell mouth (21).

Lastly, with reference to the corrugated pipe, it is important to stress that, where each undulated projection (23) of the corrugated surface is fitted with an isolated annular conduit (24), it is placed in communication with the exterior through a hole (25), in such a way as to uniform both the interior and the exterior of the corrugated pipe to the same pressure, eliminating at the root any danger of implosion thereof, regardless of the pressure exerted on the corrugated pipe itself.

What is claimed is:

1. An apparatus with multiple operating phases for forming stable and internally regular bell mouths on a terminal junction section of pipes made of thermoplastic material, said apparatus comprising:

a first portion comprising radially moving mechanical sectors, said first portion having a length, measured along a longitudinal axis, that is equal to a length of a bell mouth to be formed, said first portion movable from a first extreme retracted position in which the first portion presents a diameter to be freely introduced into the terminal section of the pipe, to a second extreme expanded position which dilates an entire part of the terminal section that surrounds it, thereby forming a temporary bell mouth of maximum dilation defining a temporary inner diameter that corresponds to an outer diameter of said first portion when said first portion is moved to the position of extreme dilation, said temporary inner diameter being greater than a nominal final diameter of the bell mouth to be formed;

means for heating said first portion to a temperature that is greater than or equal to that of the terminal section of the pipe, so that the terminal section of the pipe does not release heat during its plastic dilation to form the temporary bell mouth of maximum dilation;

a second portion that is geometrically fixed and that includes an outer diameter equal to the nominal inner diameter of the bell mouth that is to be formed, said second portion adapted for introduction into the temporary bell mouth of maximum dilation, after the complete intervention of said first portion which, in the retracted position, allows the free subsequent introduction of said second portion into the temporary bell mouth of maximum dilation, said second portion dimensioned to calibrate exactly an inner diameter of the bell mouth that is to be formed, subject to spontaneous retraction after the previous dilation and comprising means for being cooled below the temperature of the terminal section, thereby rapidly bringing the bell mouth to ambient temperature, once it has reached the nominal final diameter, said apparatus further comprising a third, preliminary intervention portion including a hollow rubber element, expandable from within by inflation from a first rest and minimum size configuration, in which the hollow rubber element presents a lesser maximum diameter than the inner diameter of the pipe whereby said hollow rubber element is enabled freely and preliminarily to be introduced first into the terminal section of the pipe, to a second maximum expansion configuration, in which the hollow rubber element presents a substantially cylindrical shape with diameter ranging between the inner diameter of the pipe and the temporary inner diameter of the temporary maximum dilation mouth, whereby said hollow rubber element is adapted to pre-form a bell mouth of intermediate dilation, into which said first portion will subsequently be able to be introduced to complete a residual dilation until forming said temporary maximum dilation mouth.

2. Apparatus as claimed in claim 1, wherein said first portion is interposed between the second portion and an extremity head, said extremity head also defining a lesser diameter than the inner diameter of the pipe, so that the mechanical sectors are bilaterally guided along planes perpendicular to the longitudinal axis, wherein said preliminary intervention portion is positioned forward of the extremity head related to the first portion.

3. Apparatus as claimed in claim 1, wherein at least one of said first, second and third portions is separated from the other of said first, second and third portions and has a different working axis than the other of said first, second and third portions.

4. Apparatus as set forth in claim 2, wherein all said first, second and third portions and are in mutual combination to form a single composite mandrel devised on a single axis coaxial to the pipe to be worked, said apparatus further comprising:

means for driving the expansion and retraction of the first portion; and, means for actuating the relative motion between mandrel and pipe that operate along the longitudinal axis of the mandrel and in combination and synchrony with said means for driving the expansion and retraction of the first portion.

5. Apparatus as claimed in claim 4, wherein at least the second portion is removably interchangeable relative to the other portions.

6. Apparatus as claimed in claim 1, further comprising:
means for exerting compressed fluid pressure acting from the exterior on the outer wall of the terminal section when said second portion is located in said temporary bell mouth to accelerate calibration and further to improve regularity of an inner surface of the bell mouth.

7. Apparatus as claimed in claim 1, wherein said hollow rubber element defines variable thickness so as to maintain a substantially cylindrical shape upon its inflation.

8. Apparatus as claimed in claim 1, wherein the outer diameter of the second portion is computed as a function of the thermoplastic material.

9. Apparatus as claimed in claim 2, further comprising, in combination with said second portion, means for exerting compressed fluid pressure acting from the exterior on the outer wall of the terminal section when said second portion is located in said temporary bell mouth to accelerate calibration and further to improve regularity of an inner surface of the bell mouth.

10. Apparatus as claimed in claim 3, further comprising, in combination with said second portion, means for exerting compressed fluid pressure acting from the exterior on the outer wall of the terminal section when said second portion is located in said temporary bell mouth to accelerate calibration and further to improve regularity of an inner surface of the bell mouth.

11. Apparatus as claimed in claim 4, further comprising, in combination with said second portion, means for exerting compressed fluid pressure acting from the exterior on the outer wall of the terminal section when said second portion is located in said temporary bell mouth to accelerate calibration and further to improve regularity of an inner surface of the bell mouth.

12. Apparatus as claimed in claim 5, further comprising, in combination with said second portion, means for exerting compressed fluid pressure acting from the exterior on the outer wall of the terminal section when said second portion is located in said temporary bell mouth to accelerate calibration and further to improve regularity of an inner surface of the bell mouth.

13. Apparatus as claimed in claim 2, wherein said hollow rubber element defines variable thickness so as to maintain a substantially cylindrical shape upon its inflation.

14. Apparatus as claimed in claim 3, wherein said hollow rubber element defines variable thickness so as to maintain a substantially cylindrical shape upon its inflation.

15. Apparatus as claimed in claim 4, wherein said hollow rubber element defines variable thickness so as to maintain a substantially cylindrical shape upon its inflation.

16. Apparatus as claimed in claim 5, wherein said hollow rubber element defines variable thickness so as to maintain a substantially cylindrical shape upon its inflation.

17. Apparatus as claimed in claim 6, wherein said hollow rubber element defines variable thickness so as to maintain a substantially cylindrical shape upon its inflation.

18. Apparatus as claimed in claim 2, wherein the outer diameter of the second portion is computed as a function of the thermoplastic material.

19. Apparatus as claimed in claim 3, wherein the outer diameter of the second portion is computed as a function of the thermoplastic material.

20. An apparatus for forming a stable and internally regular bell mouth having a nominal final inner diameter on a terminal junction section of an associated thermoplastic pipe that is pre-heated to a select temperature and that defines a starting inner diameter, said apparatus comprising:

a first portion comprising means for moving said first portion from a first, retracted position where said first portion defines an outer diameter less than the starting inner diameter of the associated thermoplastic pipe to a second, expanded position, where said first portion defines an outer diameter that is greater than the nominal final inner diameter of the bell mouth to be formed;

means for heating said first portion to a temperature that is at least equal to the select temperature to which the terminal section of the associated pipe is pre-heated;

a second portion that is geometrically fixed and that comprises an outer diameter that is equal to the nominal final inner diameter of the bell mouth that is to be formed, said outer diameter of said second portion being less than the outer diameter of said first portion when said first portion is moved to said second, expanded position;

means for selectively cooling the second portion below the select temperature of the terminal section of the associated pipe; and, a third, preliminary intervention portion comprising a hollow rubber element that is selectively expandable from a first, minimum diameter that is less than the starting inner diameter of the associated pipe to a second, maximum diameter that is between the first, minimum diameter of the third portion and the outer diameter of said first portion when said first portion is moved to said second, expanded position.

\* \* \* \* \*